G. C. AVERY.
PLOW.
APPLICATION FILED NOV. 10, 1909.
Reissued Jan. 4, 1910.
13,066.
2 SHEETS—SHEET 1.
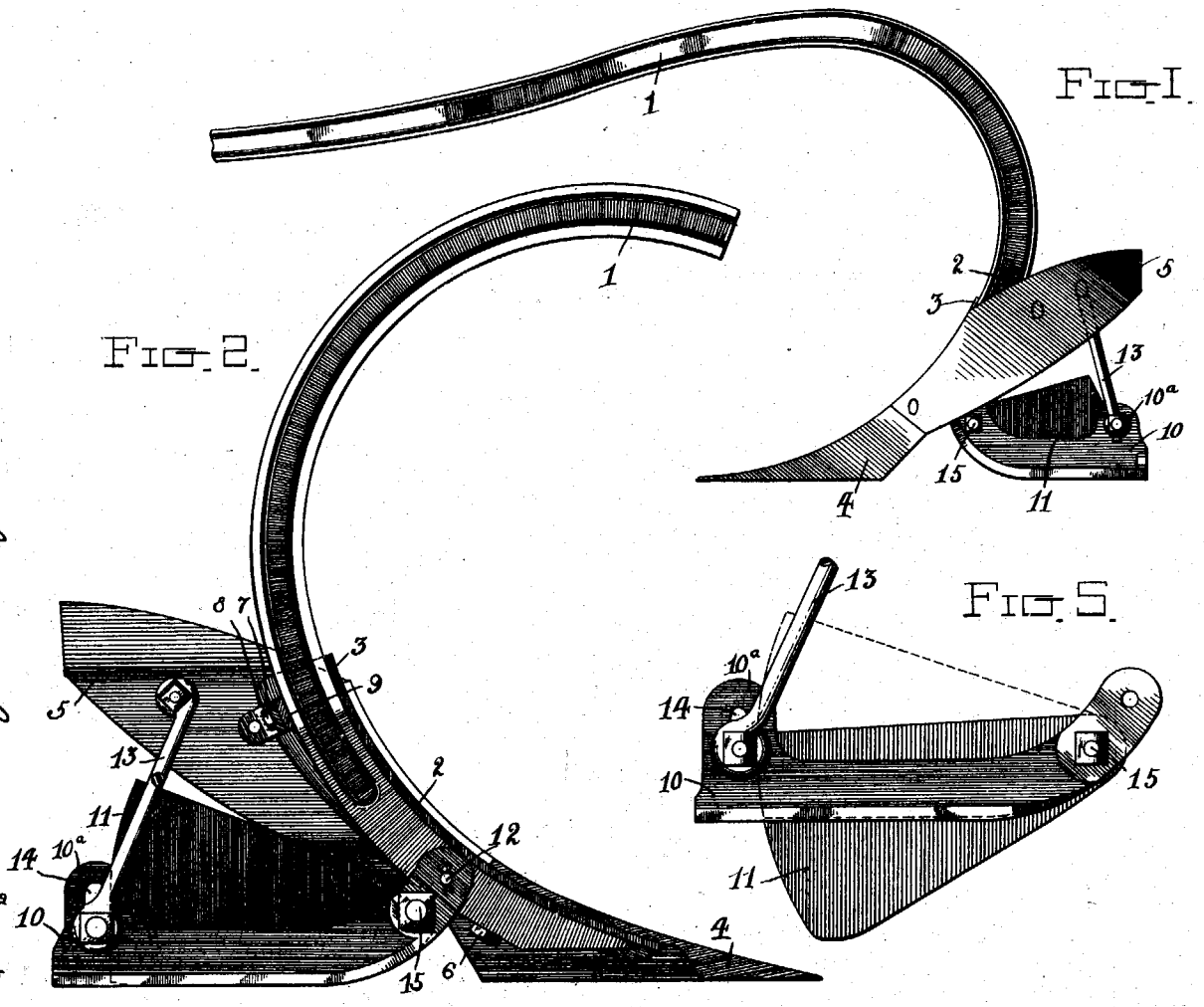
Witnesses
J. Milton Jester.
Edwin Bruce.
Inventor
George C. Avery
By C. J. Stockman
Attorney

G. C. AVERY.

PLOW.

APPLICATION FILED NOV. 10, 1909.

Reissued Jan. 4, 1910.

13,066.

2 SHEETS—SHEET 2.

Witnesses

J. Milton Jester.

Edwin Cruce.

Inventor

George C. Avery

By C. J. Stockman

Attorney

UNITED STATES PATENT OFFICE.

GEORGE C. AVERY, OF LOUISVILLE, KENTUCKY, ASSIGNOR TO B. F. AVERY & SONS, OF LOUISVILLE, KENTUCKY, A FIRM.

PLOW.

13,066. Specification of Reissued Letters Patent. Reissued Jan. 4, 1910.

Original No. 650,771, dated May 29, 1900, Serial No. 738,701. Application for reissue filed November 10, 1909. Serial No. 527,346.

*To all whom it may concern:*

Be it known that I, GEORGE C. AVERY, a citizen of the United States, residing at Louisville, in the county of Jefferson and State of Kentucky, have invented certain new and useful Improvements in Plows; and I do hereby declare the following to be a full, clear, and exact description, such as will enable others skilled in the art to which it appertains to make and use the same.

My invention relates to improvements in plows, and particularly to that class of plows known as "double-moldboard" or "middle-burster" plows.

It consists in a plow having a suitable share and moldboard, a standard carrying the same, an adjustable shoe or depth-runner comprising divided runners pivoted at their forward ends to the lower end of the standard and adjustably connected at their rear ends to the moldboard and a rudder or knife pivotally mounted between the portions of the depth-runner, and means for adjusting the said knife or rudder to different depths with respect to the runner in order to hold the plow steady in its movements.

It also consists in certain other novel constructions, combinations, and arrangements of parts, as will be hereinafter fully described and claimed.

Figure 3:
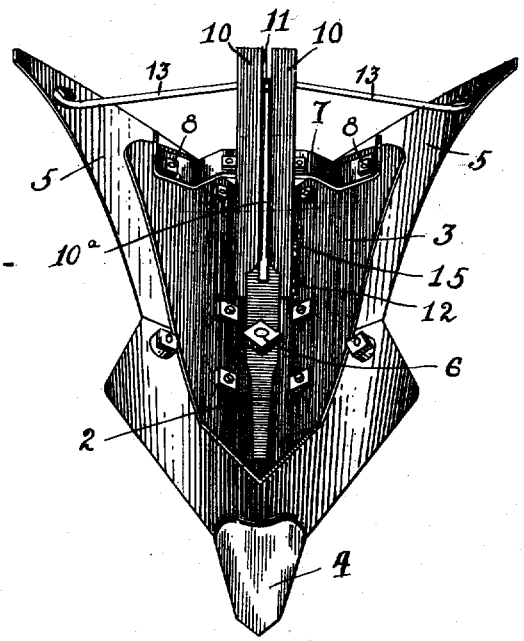
Figure 4:
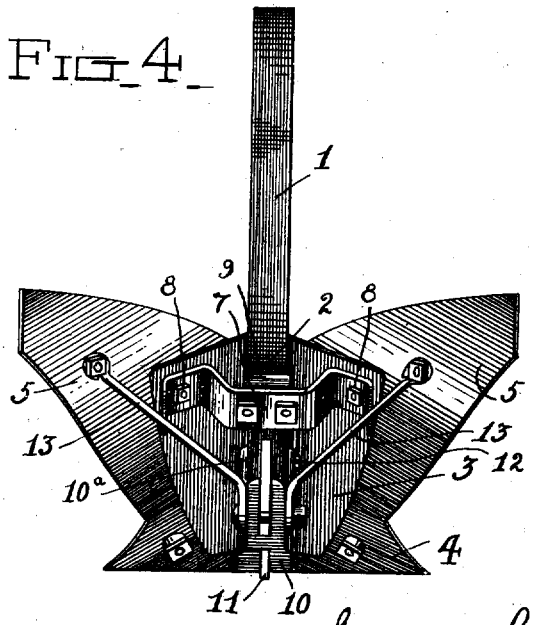

In the accompanying drawings, Figure 1 represents a side elevation of a burster-plow constructed in accordance with my invention. Fig. 2 represents a vertical section through the said plow, the standard and depth-runners being shown in side elevation. Fig. 3 represents a bottom plan view of the plow, and Fig. 4 represents a vertical transverse section through the plow and depth-runner. Fig. 5 is a detail view of the runner and knife.

My invention is designed to provide a middleburster or double-moldboard plow of superior quality and one which shall be provided with a depth-runner and a guiding-rudder, both of which are adjustable.

In carrying out my invention, I preferably curve the beam 1 of the plow downwardly and forwardly, so as to form a standard, as 2, to which are secured the frog 3, share 4, and moldboards 5. The frog 3 is made alike on both sides of the standard and near its forward end is fastened thereto by a bolt 6, which is passed through the forward end of the standard. The rear end of the frog is secured to the standard by means of a cross-piece, as 7, and two bolts, as 8 8, which pass on either side of the standard 2. This construction enables me to secure the frog and the parts carried thereby firmly upon the plow-standard without passing a bolt-hole through the standard at this point, and thereby materially weakening the same. A wedge or space-block, as 9, may be inserted between the brace and the standard, if desired, to prevent the necessity of taking up the space between the brace and the standard. A double share provided with a suitable plow-point is firmly bolted or riveted to the frog 3, while above the share and upon each side of the plow are firmly bolted two moldboards of the same size and shape, the two forming when secured in position a double moldboard 5. The plow thus has a middle ridge or burster for breaking the earth and turning it upon either side.

Important features of my invention are the adjustable depth-runner or shoe and the adjustable knife or rudder mounted thereon. The depth-runner 10 is composed of two pieces arranged side by side and of the same shape and applied together, so as to inclose the knife 11 between them. The forward end of each portion of the runner 10 is curved upwardly and reduced in thickness, so as to project upon either side of the standard 2. These forward ends of the shoe-sections are pivoted to the said standard by means of a bolt or pin, as 12, which is preferably held in position by means of a cotter-pin, so that it may easily be removed, if desired. The rear ends of the runner-sections are provided with vertical elongated slots 14, through which a bolt may be passed, securing the said rear ends to rigid brace-rods, as 13 13. The other ends of the said brace-rods are securely bolted to the moldboard 5. The slots 14 in the shoe-sections permit of the shoe being adjusted upon its pivot-pin to different depths. The upper portions of the runner-sections are preferably made thin, while the lower edges are widened out and slightly rounded upon the lower surface to form a broad bearing-surface for engaging the ground. This broad surface is secured by forming lateral extending flanges $10^a$ $10^a$ upon each side of the runner, one on each section thereof.

Pivotally mounted between the sections of the shoe 10 is the knife or rudder 11, which is a broad plate curved at its forward end and pivoted at the said forward end between the shoe-sections upon a bolt 15. The rear end of the rudder is clamped between the shoe-sections, when the same is bolted to the brace-rods 13. Thus the knife or rudder is pivoted to the shoe and the shoe is pivoted to the standard, and one clamping-bolt holds both the knife or rudder and the shoe or depth-runner in their adjusted positions.

It will be apparent from the above description that my improved double-moldboard plow is simple in construction and yet may be made very strong, so as to be effective for its work. The depth-runner and rudder or knife can be readily and quickly adjusted to different depths and materially assist in the operation of the plow.

Having now described my invention, what I claim as new, and desire to secure by Letters Patent, is—

1. A plow having a suitable standard, a double frog secured thereto, a cross-brace for securing the frog to the standard, bolts connecting the brace to the frog and passing along each side of the standard so as to bind the frog rigidly around the standard without passing a bolt-hole through the standard and thereby weakening the same, a double share riveted to the said frog and double mold-boards bolted to the same for producing a burster or middle-ridge plow, substantially as described.

2. In a plow, the combination with the standard, share and moldboard, of a depth-runner pivoted at its forward end to the standard, a knife or rudder pivoted at its forward end to the depth-runner, and a single means for independently adjusting the rear ends of the depth-runner and rudder, substantially as described.

3. In a plow, the combination with a standard, share and moldboard, of a depth-runner pivoted at its forward end to the standard, a knife or rudder pivoted at its forward end to the depth-runner, and a single means for adjusting the height of the depth-runner and clamping the rear end of the rudder thereto, substantially as described.

4. In a middleburster plow, a pivoted runner, a pivoted rudder, a rigid support secured to a suitable part of the plow structure and extending thence to the rear end of the runner, and a through-bolt, said parts so correlated that the support sustains by means of the through-bolt the runner and rudder in adjustable relation to each other and to the plow.

5. In a middleburster plow, the combination of a rigid support, a pivoted runner, a pivoted rudder and a suitable means of securing the runner and the rudder in adjustable relations to each other and to the plow at one operation.

6. In a plow, the combination with a standard, share and moldboard, of a depth-runner comprising two sections pivoted at their forward ends on opposite sides of the standard, a knife or rudder pivoted at its forward end between the sections of the depth-runner, and a single means for adjusting the height of the rear ends of the depth-runner and clamping the knife or rudder between its sections, substantially as described.

7. In a plow, the combination with a suitable standard, moldboard and share, of a depth-runner, comprising two sections of similar shape, applied side by side and pivoted at their forward ends to each side of the plow-standard, the said sections having vertical slots at their rear ends, brace-rods rigidly secured to the moldboard and extending toward the runner, a bolt passing through eyes in the said rods and through the slots in the runner, and a knife or rudder pivoted between the said depth-runner sections, whereby the said runner may be clamped in different adjusted positions between the runner-sections, substantially as described.

8. A double-moldboard plow, comprising a standard, a double frog, a double share secured thereto, and a double moldboard secured to the same, a depth-runner arranged beneath the moldboard and formed of two sections having their forward ends curved forwardly and pivotally attached on each side of the plow-standard, the said runner-sections being provided with vertical, elongated slots at their rear ends, laterally-extending flanges formed upon the lower edges of the said sections to provide a broad bearing-surface, a knife-plate or rudder pivoted between the sections of the runner, the said rudder being curved at its forward end and pivoted between the forward ends of the runner-sections, rigid brace-rods extending from the moldboard to each side of the runner, a clamping-bolt passing through eyes upon the said brace-rods and through the elongated slots in the runner-sections so as to clamp the runner in different adjusted positions, the knife or rudder being thereby clamped between the said sections in its different adjusted positions, substantially as described.

In testimony whereof I hereunto affix my signature in the presence of two witnesses.

GEORGE C. AVERY.

Witnesses:

CHARLES F. HUHLEIN,

J. FRED HARTKEMERER, Jr.